United States Patent [19]

Schumann

[11] Patent Number: 4,646,087
[45] Date of Patent: Feb. 24, 1987

[54] INDUCTIVELY COUPLED POSITION DETECTION SYSTEM

[76] Inventor: Douglas D. Schumann, 1407 Flanders Rd., Southington, Conn. 06489

[21] Appl. No.: 548,410

[22] Filed: Nov. 3, 1983

[51] Int. Cl.⁴ .............................................. G08C 19/06
[52] U.S. Cl. .......................... 340/870.31; 74/471 XY; 340/365 L
[58] Field of Search .......... 340/365 R, 365 L, 870.31, 340/870.32, 709, 820.37; 200/6 A; 74/471 XY; 178/19

[56] References Cited

U.S. PATENT DOCUMENTS

| | | | |
|---|---|---|---|
| 3,918,021 | 11/1975 | Nishioka | 74/471 XY |
| 4,364,047 | 12/1982 | Archer | 200/6 A |
| 4,459,578 | 7/1984 | Sava | 200/6 A |
| 4,489,303 | 12/1984 | Martin | 200/6 A |
| 4,492,830 | 1/1985 | Kim | 200/6 A |
| 4,500,867 | 2/1985 | Ishitobi | 200/6 A |
| 4,501,939 | 2/1985 | Hyltin | 200/6 A |
| 4,519,266 | 5/1985 | Reinecke | 74/471 XY |

Primary Examiner—John W. Caldwell, Sr.
Assistant Examiner—Michael F. Heim

[57] ABSTRACT

An inductively coupled position sensing system wherein voltages induced in plural stationary sensor coils are combined and synchronously detected. Variation in the induced voltages results from movement of a drive coil mechanically coupled to a member the position or orientation of which is of interest.

15 Claims, 3 Drawing Figures

INDUCTIVELY COUPLED POSITION DETECTION SYSTEM

BACKGROUND OF THE INVENTION (1) Field of the Invention

The present invention relates to the detection of the position of a movable member relative to a reference point and particularly to the sensing and subsequent generation of signals commensurate with the movements of a control member. More specifically, this invention is directed to position sensing systems wherein there is no direct mechanical connection between the member, the position of which is to be monitored, and the elements which sense and provide signals indicative of the position of that member. Accordingly, the general objects of the present invention are to provide novel and improved methods and apparatus of such character.

(2) Description of the Prior Art

There are numerous situations where the position or orientation of a movable member relative to a point or axis must be sensed. Such sensing may be for the purpose of providing position or orientation information or it may be for the purpose of generating signals which are employed in the exercise of control over a remotely located apparatus. For example, it may be mandatory or desirable to detect and indicate an out-of-level condition of a platform, typically for the purpose of actuating devices which return the platform to the desired level condition. As a further example, there are numerous cases where it is desirable to provide a controller, capable of one-hand operation, for generating control signals for devices which adjust the position of a member about two or three axes. The latter example is exemplified by cranes and other similiar pieces of construction equipment which are controlled by means of a "joystick".

Perhaps the most common method of sensing the position of a movable member relative to a pair of mutually orthoginal axes is to couple the wiper arms of potentiometers to the movable member. While this technique may be suitable for applications such as electronic games, where a high degree of reliability is not required, the use of wiping-type contacts is certainly not conducive to long trouble-free operation. While it has been suggested that wiping contacts may be eliminated through the use of LVDT systems, wherein a magnetic core moves with the member of interest relative to fixed coils, such magnetic position sensors are characterized by sensitivity to noise. This is particularly disadvantageous in the case of a position sensing system which will be used in an environment where other electrical machinery may be operating. A further disadvantage incident to the use of a moving core resides in the fact that, in order to provide an output signal of usable magnitude, specially shaped cores must be formed at considerable expense.

SUMMARY OF THE INVENTION

The present invention overcomes the above-briefly discussed and other deficiencies and disadvantages of the prior art by providing a novel non-contacting technique for determining the position relative to two or three mutually orthoginal axes of a movable member. The present invention also encompasses unique apparatus for use in the practice of the aforesaid method. Apparatus in accordance with the present invention comprises an inductively coupled position sensing system having either a drive coil which moves with the member of interest, i.e., the member the position or orientation of which is to be monitored, or having a fixed position drive coil and an armature which is movable with the member. Apparatus in accordance with the preferred embodiment of the present invention comprises a plurality, four in the case of an X-Y position sensor, of pick-up coils which are respectively located so as to define a pair of intersecting stationary axes, i.e. an X-Y coordinate system with four quadrants. One of the pick-up coils is located in each of these quadrants. The preferred embodiment further comprises a synchronous detection system, associated with the pick-up coils, which is substantially immune to interference. The pick-up coils are arranged and interconnected such that the mathematical sum of the induced voltages will, subsequent to detection, be of a magnitude and polarity which is indicative of the position of the drive coil or armature, the armature if employed being moved within the air gap to vary reluctance.

Apparatus in accordance with the present invention is characterized by mechanical reliability. In accordance with a preferred embodiment a "joystick" is supported in a housing via a ball and socket-type connection. Centering of the joystick, upon release of a force on the handle thereof, is achieved through the use of a single helical compression spring. The drive coil of the preferred embodiment is mounted at the end of the joystick which is disposed oppositely to the handle. The pick-up coils of this embodiment are sized and positioned so as to be spacially separated from one another and located below the drive coil. With the joystick in its neutral position, the drive and pick-up coils lie in substantially parallel planes and the drive coil partly overlaps, i.e., shadows, the pick-up coils. The drive coil is excited with a signal having a sinusoidal wave form and, through the use of comparator circuitry, the desired magnitude of the drive voltage is maintained. The sinusoidal drive voltage is also compared with a regulated D.C. supply voltage to produce a first square wave signal which is exactly in phase with the drive voltage. This first square wave signal is, in turn, employed to generate a second square wave signal which is precisely out-of-phase with the first square wave. The two square wave signals are employed to control switches connected in series with the pick-up coils, the switches thus functioning as phase controlled rectifiers. The half wave rectified signals passed by the synchronously controlled switches are integrated and amplified to provide, in the case of an X-Y position detector, a pair of signals respectively commensurate with the position of the drive coil relative to the two axes. These signals may be processed to provide a position indication and/or analog or digital position command signals.

BRIEF DESCRIPTION OF THE DRAWING

The present invention may be better understood and its numerous objects and advantages will become apparent to those skilled in the art by reference to the accompanying drawing wherein like reference numerals refer to like elements in the several FIGURES and in which.

DESCRIPTION OF THE DISCLOSED EMBODIMENT

Figure 1:
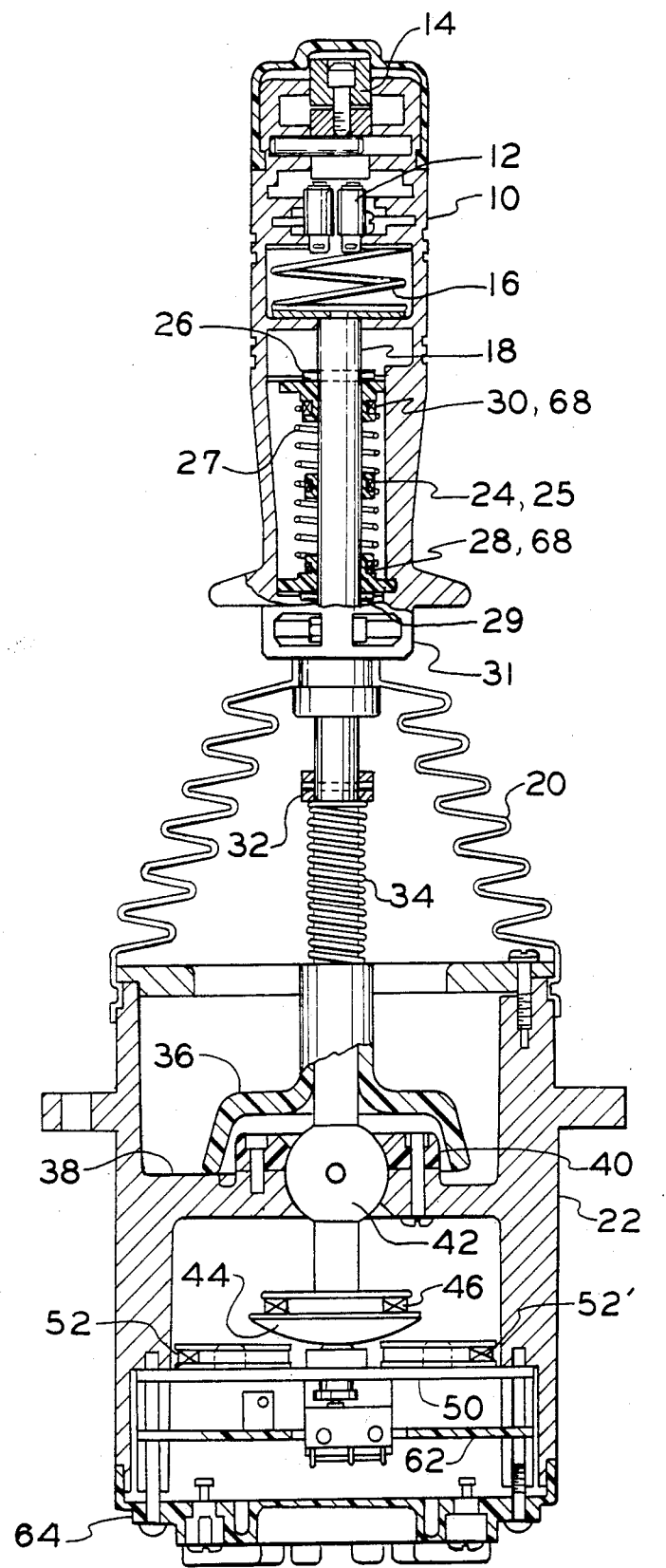
FIG. 1 is a cross-sectional side elevation view of a multi-axis control in accordance with the present invention.

With reference to the drawing, FIG. 1 shows a joystick-type contactless controller which has the capability of providing single hand control simultaneously over four functions. The four functions comprise position control with respect to three mutually perpendicular axes and on/off control. The control signals with respect to the axes, i.e., in the X, Y and Z coordinates, are controlled by forward/aft, right/left and up/down movement of the grip portion 10 of the control lever. The "on/off" function is responsive to a thumb-operated rocker switch 12 located in the top of handle 10, switch 12 being operated by a manually activated plunger 14. A first spring 16 is provided within handle 10 for the purpose of offsetting the effects of gravity and/or the weight of the operator's hand, i.e., spring 16 provides a bias whereby upward and downward motion will require the application of equal force.

A shaft 18 extends along the interior of handle 10 through a flexible boot 20 to the interior of a housing 22. Shaft 18 is defined by a pair of co-axial members which are axially movable relative to one another. The outer of these co-axial members is provided with a bobbin 24, on which a drive coil 25 is wound, adjacent the upper end thereof. A pin 26 and adjacent bobbin 30 define the upper stop for a second spring 27 which is coaxial with shaft 18. The opposite end of spring 27 is captured by a second bobbin 28, on which a first pick-up coil 68 is wound. Bobbin 28 is held from moving further down the shaft 18 by a pin 29. A second pick-up coil 68' is wound on a third bobbin 30. The rest position of bobbin 30 on shaft 18 is determined by pin 26. Spring 27 insures that the pick-up or sensor coils 68, 68' respectively on bobbins 28 and 30 are kept apart and the grip 10 is centered in the at rest position, i.e., between extremes of vertical travel. Vertical movement of grip 10 along shaft 18 will move bobbins 28 and 30 relative to bobbin 24 thus producing an inbalance between the signals induced in pick-up coils 68 and 68', this signal imbalance being the Z axis position indication. Restated, there are three coils on shaft 18. The center coil 25 is the drive coil, while the end coils 68, 68' are the sensors. The drive coil is attached to the shaft 18 and does not move vertically with the handle. The pick-up coils are slideable along shaft 18 and move with the handle whereby there is a change in their relative spacing with respect to the drive coil when the handle is moved up or down. The sum of the voltages induced in the pick-up coils will thus be commensurate with the axial motion imparted to handle 10.

The boot 20 extends from a handle extension assembly 31 to the top of housing 22. Within boot 20, a collar 32 is pinned or otherwise suitably affixed to shaft 18. Collar 32 serves as the upper stop for a further helical compression spring 34. Spring 34 extends between the collar 32 and the top of a centering cup 36 which is co-axial with shaft 18. The centering cup provides a force which causes the axis of shaft 18 to return to its perpendicular position relative to the plane defined by the upper surface of an apertured partition 38 in housing 22 when no lateral force is applied to the grip 10.

The apertured partition 38 in housing 22, which the centering cup 36 contacts, forms the lower part of a ball receiving socket. The upper portion of this socket is defined by an insert member 40 which is bolted to partition 38 as shown. The shaft 18 passes through, and is affixed to, a ball 42 which is received in this socket. This ball and socket arrangement permits movement of handle 10 in the X and Y directions.

The portion of shaft 18 which extends through and below ball 42 is provided with a bobbin 44 on which has been wound a drive coil 46. The lower side of bobbin 44 is shaped so as to permit movement thereof, in response to movements of handle 10, while maintaining the closest possible spacing to the X-Y axis sensor coils which are mounted on a coil plate 50.

Figure 3:
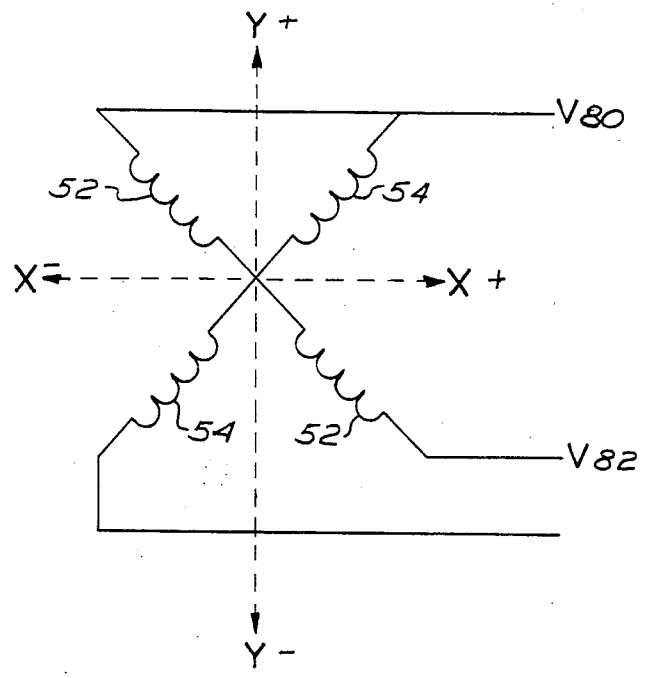
FIG. 3 is a schematic representation of the physical and electrical relationship of the pick-up coils to each other.

A pair of pick-up or sensor coils 52 and 52' may be seen in FIG. 1 and it will be understood that a line through the axes of coils 52 and 52' and parallel to the upper surface of plate 50 will define a first axis which is rotated 45° with respect to the X and Y axes about which grip 10 may be moved (see FIG. 3). A second pair of coils 54 and 54' will be mounted on plate 50 so as to define a second axis which is transverse to the first axis. The axes of the two pairs of coils will intersect at an extension of the axis of shaft 18. It is important that, in the neutral position of handle 10 depicted in FIG. 1, drive coil 46 lies in a plane which is parallel to a plane through the pick-up coils and transverse to the axes thereof. It is also important that the relative positions and diameters of the coils be selected such that, in the neutral position, the drive coil 46 partially overlaps the coplanar pick-up coils which are spacially separated from one another.

Figure 2:
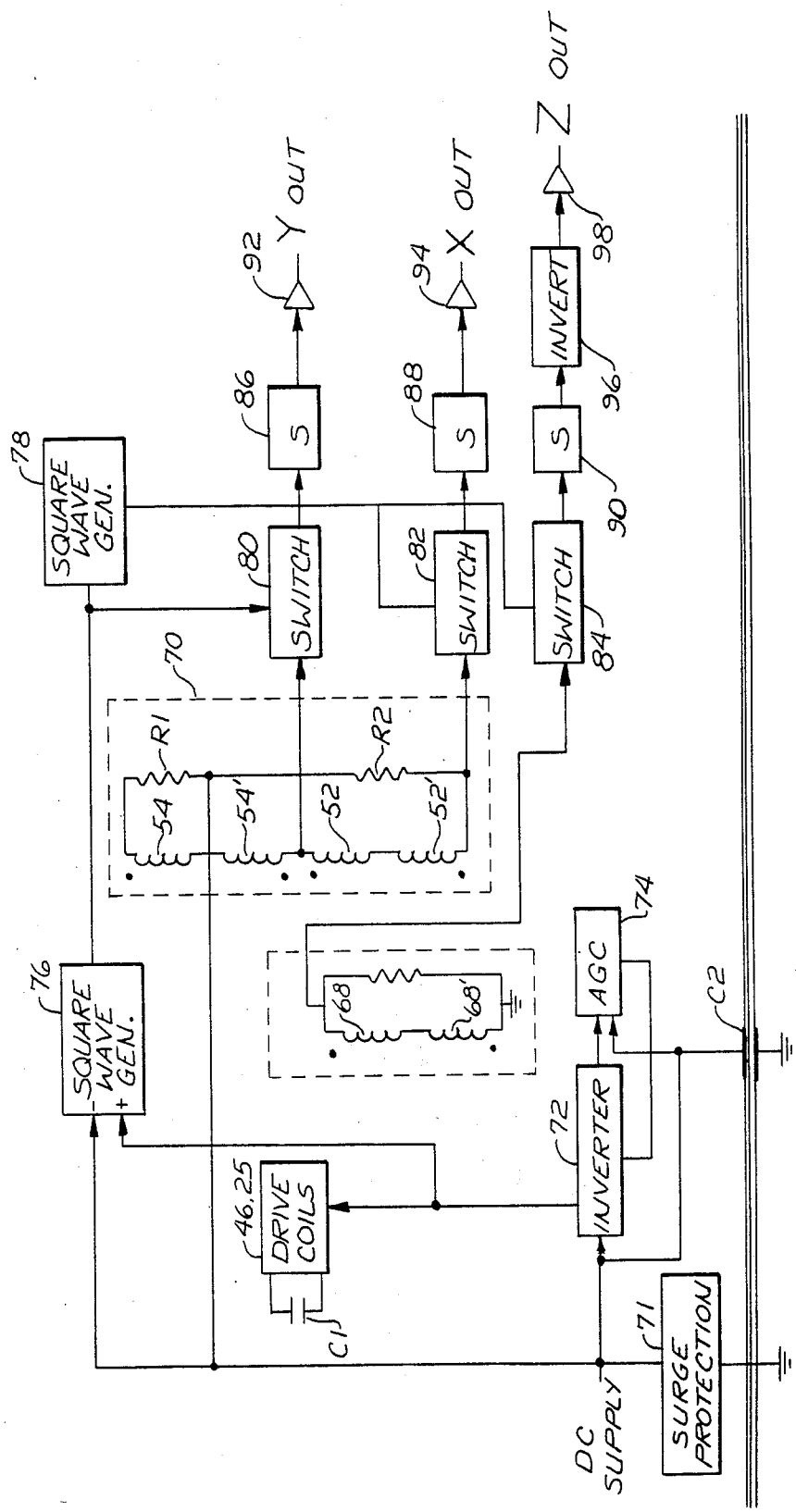
FIG. 2 is a block diagram of circuitry for use with the control of FIG. 1.

A circuit board 62 is supported within housing 22 beneath the coil plate 50 as shown. The circuitry to be described in the discussion of FIG. 2 is located on board 62. The mechanical subassembly is completed by a closure plate 64 which is bolted to housing 22, spacers being provided on the mounting bolts for the purpose of supporting circuit board 62. The drive coil 46 is energized by means of conductors, not shown, which extend from circuit board 62. These conductors are not subjected to sufficient stress, during manipulation of grip 10, to cause breakage thereof because they are of multi-strand construction and are of an adequate length and routing to distribute the bending stress.

Referring to FIG. 2, the drive coils 46 and 25 (wound on bobbin 24) and the pick-up coils 52, 52', 54, 54' and 68, 68' (wound on bobbins 28 and 30 respectively) are shown schematically. The connection and polarity of the X-Y axis sensor coils, indicated generally at 70, has been indicated using conventional symbols. A position sensor in accordance with the present invention will operate from a direct current supply which, after regulation and surge protection in a conventional circuit 71 which may include a Zener diode, is applied to a static inverter 72. The static inverter 72 comprises a conventional oscillator which provides an alternating output signal having a sinusoidal wave form. This sinusoidal output signal is delivered as the excitation voltage to the drive coils 46 and 25. The drive coils are tuned by a capacitor C1.

Stabilization and control of the amplitude of the drive coil excitation voltage is achieved by also delivering the output of inverter/oscillator 72 to an automatic gain control circuit 74. Gain control circuit 74 comprised, in one reduction to practice of the invention, a voltage comparator which received, as a second input, the regulated DC supply voltage. Whenever the negative going peak of the voltage across the drive coils becomes more negative than the supply voltage, the output of the comparator switches whereby current is injected into a capacitor C2. The voltage across capacitor C2 serves to reduce the forward bias of the output transistor of oscillator/inverter 72 with the net result that the negative going peak of the sinusoidal drive voltage remains exactly at the center-tap voltage, i.e., one-half the supply voltage. Thus, the peak-to-peak amplitude of the drive coil excitation voltage is always equal to the supply voltage. If necessary or desirable, the amplitude of the drive coil excitation voltage may be varied through the use of a biasing network connected to the input of the gain control circuit 74.

The sinusoidal output of oscillator/inverter 72 is also delivered to a square wave generator 76. Square wave generator 76 may also comprise a comparator wherein the output of oscillator/inverter 72 is compared with the regulated supply voltage. This results in the comparator providing an output signal which switches from positive to negative at the instant the excitation voltage across drive coils 46 and 25 crosses the zero voltage level. Accordingly, the square wave provided by generator 76 is exactly in phase with the drive coil excitation voltage.

The output of square wave generator 76 is delivered as a control input to a further square wave generator 78. Square wave generator 78 may comprise a CMOS switch which produces a second square wave which is exactly out-of-phase with the square wave provided by generator 76.

The square wave from generator 76 is also employed to control a CMOS switch 80. The square wave from generator 78 is employed to control a pair of further CMOS switches 82 and 84. The switches 80, 82 and 84 function as phase-controlled rectifiers with switch 80 passing a signal induced in the pick-up coils only during positive half-cycles of the drive coil excitation voltage and switches 82 and 84 passing signals only during the negative half-cycles of the excitation voltage. Thus, the combined signals induced in the pick-up coils will appear, at the outputs of the switches, as half-wave rectified positive or negative going pulses. These pulses are integrated, in integrators 86, 88 and 90. The signal appearing at the output of integrator 86 is amplified in amplifier 92 with the amplifier output becoming the Y axis position output signal. Similarly, the output of integrator 88 is amplified in amplifier 94 with the amplifier output becoming the X axis position signal. The output of integrator 90 is inverted, in an invertor 96, and then amplified in amplifier 98 to become the Z axis output signal.

Referring jointly to FIGS. 2 and 3, with four pick-up coils A, D, C, B, i.e., respectively coils 52, 52' 54 and 54', equally spaced about the axis of shaft 18 and wound and connected in the manner shown, the following relationships exist which provide position information:

$$V_{Total} = V_{54} - V_{54'} + V_{52} - V_{52'} \quad (1)$$

where $V_{Total}$ is the total induced voltage in the closed loop (through ground). The current in the loop may be expressed as:

$$I_{Total} = \frac{(V_{54} - V_{54'} + V_{52} - V_{52'})}{R1 + R2} \quad (2)$$

-continued
$$V_{82} = \frac{(V_{52} - V_{52'}) + (V_{54'} - V_{54})}{2} \quad (3)$$

where $V_{82}$ is the voltage commensurate with the "X" position at the input to switch 82.

$$V_{80} = \frac{(V_{52} - V_{52'}) + (V_{54'} - V_{54})}{2} \quad (4)$$

where $V_{80}$ is the voltage commensurate with the "Y" position at the input to switch 80.

When the drive coil is deflected directly at the gap between pick-up coils 52 and 54', i.e., in the +Y direction the signal at the input to switch 82 is a certain size and given by relationship (4) above. When the drive coil is moved so as to bring it in closer proximity to pick-up coil 54', corresponding to movement along the X axis in the +X direction, the increase in the signal induced in coil 54' is cancelled by a decrease in the signal induced in coil 52. Thus, in the example being discussed, movement of the handle of the joystick along one "X" edge of a square will not change the Y axis signal. There is, accordingly, a freedom from interaction of the two axes.

Rather than simply half-wave rectifying the signals induced in the pick-up coils, the switches 80, 82 and 84 are controlled so that the wave form outputted to the integrators and amplifiers is synchronous with the drive coil wave form. Accordingly, when interference becomes impressed upon the system, since it is as much positive as it is negative, the interference will be averaged out unless, as is exceedingly unlikely, it is synchronous with the pick-up coil wave form. Thus, by way of example, interference from an electric drill with bad brushes, operated in close proximity to the apparatus of FIGS. 1 and 2, does not appear on the output even though there is no screening.

While a preferred embodiment has been shown and described, various modifications and substitutions may be made without departing from the spirit and scope of the present invention. By way of example, temperature compensation may be added to the circuitry of FIG. 2. Thus, it will be understood that the present invention has been described by way of illustration and not limitation.

What is claimed is:

1. Non-contacting apparatus for generating electrical signals commensurate with the position of a moveable member comprising:
    a plurality of sensor coils, said sensor coils each having an axis;
    means supporting said sensor coils in a spacially displaced generally co-planar relationship with the axes thereof being substantially parallel and being substantially perpendicular to said plane, one of said coils being located in each quadrant of an X-Y coordinate system, a fifth axis generally parallel to said coil axes passing through the intersection of the X and Y axis of said coordinate system;
    magnetic field producing means, said field producing means including a drive coil having an axis, said drive coil axis being substantially parallel to said fifth axis when said field producing means is in a neutral undeflected position, said field producing means being at least in part moveable with respect to and without physical contact with said sensor coils about said fifth axis to vary the magnetic coupling between said field producing means drive coil and each of said sensor coils, the magnetic field produced by said field producing means drive coil partly encompassing all of said sensor coils at least in the neutral position of said field producing means;

means for generating an alternating excitation voltage for said field producing means;

means applying said alternating excitation voltage to said field producing means drive coil;

means coupling the moveable member the position of which is of interest to said field producing means whereby changes in the magnetic coupling between said field producing means drive coil and said sensor coils will be commensurate with movements of the member;

first switch means, said first switch means being electrically coupled to first ends of a first and a second of said sensor coils, said first and second sensor coils lying in adjacent quadrants of said coordinate system;

second switch means, said second switch means being electrically coupled to first ends of the third and fourth of said sensor coils, said third and fourth sensor coils lying in adjacent quadrants of said coordinate system;

means electrically connecting the second end of the first of said sensor coils to the second end of the third of said sensor coils;

means electronically connecting the second end of the second of said sensor coils to the second end of the fourth of said sensor coils;

means responsive to said alternating excitation voltage for providing a pair of out-of-phase switch means control signals;

means delivering said control signals to said switch means whereby said switch means will be closed in synchronism with the induction of voltages in said sensor coils; and means responsive to the voltages passed by said switch means when in the closed state for providing a pair of output signals which in combination are indicative of the direction and amount of deflection of said field producing means relative to said fifth axis.

2. The apparatus of claim 1 further comprising:
spring means for biasing the movable member to the neutral position, said drive coil partly overlapping all of said sensor coils in the neutral position.

3. The apparatus of claim 1 wherein said sensor coils are wound and interconnected to satisfy the relationships:

$$V_X = \frac{(V_A - V_D) - (V_B - V_C)}{2}$$

$$V_Y = \frac{(V_A - V_D) + (V_B - V_C)}{2}$$

where $V_A$, $V_B$, $V_D$ and $V_C$ are the voltages induced in respective adjacent coils proceeding in a first direction about the fifth axis and where $V_X$ and $V_Y$ are respectively the input voltages to said first and second switch means.

4. The apparatus of claim 3 further comprising:
spring means for biasing the movable member to the neutral position, said drive coil partly overlapping all of said sensor coils in the neutral position.

5. The apparatus of claim 1 wherein said field producing means comprises:
bobbin means, said bobbin means having a first side which has the shape of a portion of a sphere, said drive coil being wound on said bobbin means; and
means supporting said bobbin means for movement about said fifth axis, said supporting means positioning said first side of said bobbin means in close proximity to said sensor coils.

6. The apparatus of claim 5 wherein said supporting means comprises the movable member and wherein the said neutral position is with the axis of said drive coil substantially in alignment with said fifth axis.

7. The apparatus of claim 6 wherein said bobbin means is sized such that said drive coil partly overlaps all of said sensor coils in the said neutral position.

8. The apparatus of claim 7 further comprising:
spring means for biasing the movable member to said neutral position.

9. The apparatus of claim 1 wherein said field producing means comprises:
bobbin means, said bobbin means having a first side which has the shape of a portion of a sphere, said drive coil being wound on said bobbin means; and
means supporting said bobbin means for movement about said fifth axis, said supporting means positioning said first side of said bobbin means in close proximity to said sensor coils.

10. The apparatus of claim 9 wherein said supporting means comprises the movable member and wherein the said neutral position is with the axis of said drive coil substantially in alignment with said fifth axis.

11. The apparatus of claim 10 wherein said bobbin means is sized such that said drive coil partly overlaps all of said sensor coils in the said neutral position.

12. The apparatus of claim 11 further comprising:
spring means for biasing the movable member to said neutral position.

13. The apparatus of claim 12 wherein said output signal producing means comprises:
means for intergrating the voltages passed by said switch means.

14. The apparatus of claim 13 further comprising:
a second drive coil;
a pair of spacially displaced Z axis sensor coils;
means mounting said second drive coil and said Z axis sensor coils substantially coaxially, said mounting means permitting relative movement between said second drive coil and at least one of said Z axis sensor coils; and
means responsive to voltages induced in said Z axis sensor coils for providing a third output signal commensurate with the position of said moveable member.

15. The apparatus of claim 14 wherein said mounting means includes means for supporting said second drive coil and said Z axis sensor coils for movement with the moveable member, said supporting means permitting said relative movement simultaneously with movement of said moveable member relative to said fifth axis.

* * * * *